United States Patent
Gao et al.

(10) Patent No.: US 10,396,318 B2
(45) Date of Patent: Aug. 27, 2019

(54) STRETCH REMOVABLE ADHESIVE TAPES AND PREPARATION METHOD AND APPLICATION THEREOF

(71) Applicant: SAINT-GOBAIN PERFORMANCE PLASTICS CORPORATION, Solon, OH (US)

(72) Inventors: Qing Gao, Shanghai (CN); Xiaonan Zhu, Shanghai (CN); Eric Zhao, Shanghai (CN); Yue Dong, Shanghai (CN)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 414 days.

(21) Appl. No.: 15/130,514

(22) Filed: Apr. 15, 2016

(65) Prior Publication Data
US 2016/0304750 A1    Oct. 20, 2016

(30) Foreign Application Priority Data
Apr. 15, 2015    (CN) .......................... 2015 1 0179093

(51) Int. Cl.
| | | |
|---|---|---|
| *H01M 2/08* | (2006.01) | |
| *H01M 2/02* | (2006.01) | |
| *C09J 7/25* | (2018.01) | |

(52) U.S. Cl.
CPC .............. *H01M 2/08* (2013.01); *C09J 7/25* (2018.01); *H01M 2/0257* (2013.01); *C09J 2201/128* (2013.01); *C09J 2201/622* (2013.01); *C09J 2203/33* (2013.01); *C09J 2433/00* (2013.01); *C09J 2475/006* (2013.01)

(58) Field of Classification Search
CPC ...... C09J 7/0282; C09J 7/25; C09J 2475/006; C09J 2201/622; C09J 2201/128; C09J 2433/00; C09J 2203/33; H01M 2/0257; H01M 2/08
See application file for complete search history.

(56) References Cited

U.S. PATENT DOCUMENTS

| | | | |
|---|---|---|---|
| 6,231,962 B1 | 5/2001 | Bries et al. | |
| 6,403,206 B1 | 6/2002 | Bries et al. | |
| 6,527,900 B1 * | 3/2003 | Kreckel | A47G 1/175 156/247 |
| 7,063,887 B2 | 6/2006 | Kobe et al. | |
| 8,557,378 B2 | 10/2013 | Yamanaka et al. | |
| 2001/0051298 A1 * | 12/2001 | Hanafusa | H01M 2/0207 429/162 |
| 2008/0135159 A1 | 6/2008 | Bries et al. | |
| 2009/0229732 A1 | 9/2009 | Determan et al. | |

FOREIGN PATENT DOCUMENTS

| | | |
|---|---|---|
| CN | 1545401 A | 11/2004 |
| CN | 102015944 A | 4/2011 |
| CN | 102477264 A | 5/2012 |
| CN | 104479599 A | 4/2015 |
| WO | 2002072162 A2 | 9/2002 |

* cited by examiner

*Primary Examiner* — Muhammad S Siddiquee
(74) *Attorney, Agent, or Firm* — Abel Schillinger, LLP; Alexander H. Plache

(57) ABSTRACT

Certain embodiments of the present disclosure are directed to a stretch removable adhesive tape comprising a thermoplastic polyurethane film having a unique combination of properties leading to a unique stretch removal profile.

18 Claims, 3 Drawing Sheets

STRETCH REMOVABLE ADHESIVE TAPES AND PREPARATION METHOD AND APPLICATION THEREOF

FIELD OF THE DISCLOSURE

The present disclosure relates to adhesive tapes, and more particularly to, adhesive tapes being removable by stretching.

RELATED ART

Recently, as the electronics industry is moving to smaller and more miniaturized components, commercially available adhesives tapes have become ineffective due to their large size and the inability to decrease the thickness of the tape without negatively impacting its adhesion strength and maintaining a desirable stretch removable profile.

Accordingly, the current inventors have surprisingly discovered a unique tape arrangement and method of making the tape which overcomes these and other drawbacks.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the tape arts.

The present disclosure is directed to stretch removable adhesive tapes which possess excellent adhesion and easy reworkablity at an unparalleled low thickness. The concepts are better understood in view of the embodiments described below that illustrate and do not limit the scope of the present invention.

Figure 1:
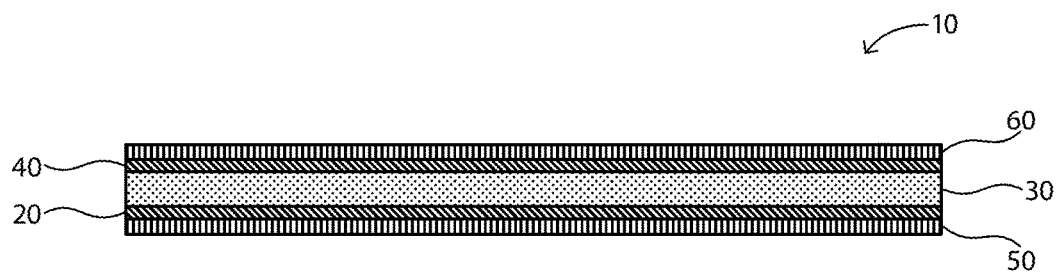
FIG. 1 includes an illustration of an adhesive tape according to one embodiment.

Referring now to FIG. 1, the adhesive tape 10 can include a first adhesive layer 20 and a second adhesive layer 40 sandwiching a core 30. As illustrated in FIG. 1, the first adhesive layer 20 can be adjacent to, or even directly contacting, the core 30. Similarly, the second adhesive layer 40 can be adjacent to, or even directly contacting, the core 30 on the opposing major surface of the core.

In particular embodiments, the adhesive tape 10 can further include a first release liner 50 disposed adjacent to, or even directly contacting, the first adhesive layer 20. Further, the adhesive tape 10 can include a second release liner 60 disposed adjacent to, or even directly contacting, the second adhesive layer 40. The first and second release liners 50,60 can be adapted to be removed from the tape 10 before use as is well understood in the art.

It is to be understood that the tape illustrated in FIG. 1 is one exemplary embodiment, and fewer or additional layers can be used and still be within the scope of one or more embodiments of the present disclosure. For example, in some embodiments, the tape can be a single-sided adhesive tape.

The first and/or second adhesive layers 20, 40 can include an adhesive composition including an acrylic adhesive. In particular embodiments, the first and/or second adhesive layers 20,40 can include an acrylic adhesive. In very particular embodiments, the first and second adhesive layers 20,40 consists essentially of an acrylic adhesive.

In further embodiments, the first and second adhesive layers 20,40 can include a pressure sensitive adhesive.

In certain embodiments, the first and/or second adhesive layer can have a desirable adhesion build up. Adhesion build up is the change is adhesive property over time. As used herein, adhesion build up of an adhesive material is determined by coating the adhesive onto a PET film, drying the adhesive, and testing the 180 degree peel adhesion as described below on a stainless steel substrate with a dwell time of 20 minutes, 1 hour, 4 hours, 24 hours and 72 hours or longer. The ratio of the adhesion value at 20 minutes and the adhesion value at 72 hours is then calculated and multiplied by 100% to arrive at the adhesion build up. Typically, adhesives reach their steady state adhesion in about 72 hours, but it is to be understood that the adhesion value at 72 hours is taken as the final steady state adhesion value and compared with the adhesion value at 20 minutes for purposes of determining the adhesion build up. A percentage near 100% indicates that the adhesive composition reaches its final adhesion value quickly. In fact, a particular advantage of certain embodiments of the present disclosure is the incorporation of one or more adhesive layers that has a high adhesion build up and therefore reaches its final adhesive strength quickly.

Accordingly, in certain embodiments, the first and/or second adhesive layer can have an adhesion build up of at least about 5%, at least about 10%, at least about 15%, or even at least about 20%. In further embodiments, the first and/or second adhesive layer can have an adhesive build up of no greater than about 99%, no greater than about 90%, no greater than about 80%, or even no greater than about 70%. Moreover, first and/or second adhesive layer can have an adhesive build up of in a range of any of the minimums and maximums provided above, such as in a range of from about 5% to 95%, or even from about 10% to about 70%.

The first and/or second adhesive layers 20,40 can have a desirable thickness. For example, in particular embodiments, the first and/or second adhesive layer can have a thickness of at least about 0.005 mm, at least about 0.01 mm, or even at least about 0.02 mm. In further embodiments, the first and/or second adhesive layer can have a thickness of no greater than about 0.3 mm, no greater than about 0.1 mm, no greater than about 0.05 mm, no greater than about 0.04, or even no greater than about 0.03 mm. Moreover, the first and/or second adhesive layer can have a thickness in a range of any of the minimums and maximums provided above, such as in range of from about 0.01 mm to about 0.05 mm.

In particular embodiments, the core 30 can include a film. In very particular embodiments, the core 30 can consist essentially of a film. In other embodiments, the core 30 can include any other layers as is desirable and well known in the art. In very particular embodiments, the core can be essentially free of a foam layer. As used herein, the core 30 is defined as the region between the two outer adhesive layers, such as between and including the first and second adhesive layers 20,40.

In certain embodiments, the core 30 can include a film. In particular embodiments, the core 30 can include a thermoplastic film. In very particular embodiments, the core 30 can include a thermoplastic polyurethane film. In very particular embodiments, the core 30 can consist essentially of a thermoplastic polyurethane film.

In certain embodiments, the film can have a desirable thickness. For example, in particular embodiments, the film can have a thickness of at least about 0.005 mm, at least about 0.008 mm, or even at least about 0.01 mm. In further embodiments, the film can have a thickness of no greater than about 0.45 mm, no greater than about 0.3 mm, no greater than about 0.2 mm, no greater than about 0.1 mm, no greater than about 0.05 mm, no greater than about 0.045 mm, no greater than about 0.04 mm, no greater than about 0.035 mm, no greater than about 0.03 mm, no greater than about 0.025 mm, or even no greater than about 0.02 mm. Moreover, the film can have a thickness in a range of any of the minimums and maximums provided above, such as in a range of from about 0.005 mm to about 0.5 mm, or even from about 0.01 mm to about 0.3 mm.

In certain embodiments, the film can have a desirable elongation at break (also referred to as strain σ) and tensile strength (also referred to as stress ε). As used herein, elongation at break is measured according to ASTM D412 as is well understood in the art.

Figure 2:
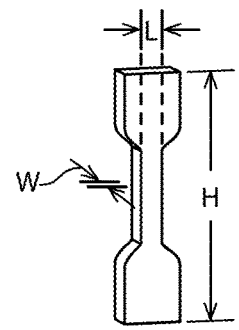
FIG. 2 includes an illustration of a test sample of an adhesive tape for testing under ASTM D412.

In particular, a dumbbell-like sample of the film as illustrated in FIG. 2 with a height (h) of 38 mm, a length (l) of 5 mm, and the width (w) being the thickness of the sample being tested. The sample is gripped between the two jaws of a Texture Analyzer (TA-XT Plus) and separated at a rate of 50 mm/min. The load cell is 500 N. The force and dimension at break is recorded. Stress is calculated by formula I below:

$$\varepsilon = \frac{F}{A} = \frac{F}{l \times w} \qquad \text{Formula I}$$

where ε refers to stress,
F refers to the tensile force at break,
and A refers to the cross-section area of the un-stretched specimen.

Strain (i.e. Elongation at break) is calculated by formula II below:

The strain (σ) is calculated by following equation:

$$\sigma = \frac{L - L_0}{L_0} \times 100\% \qquad \text{Formula II}$$

where $L_0$ is the initial distance between the bench marks, and L is the distance between the bench marks at the time of rupture.

Accordingly, in particular embodiments, the film can have an elongation at break of at least about 250%, at least about 300%, at least about 350%, or even at least about 400%. In further embodiments, the film can have an elongation at break of no greater than about 1200%, no greater than about 1100%, no greater than about 1000%, or even no greater than about 850%. Moreover, the film can have an elongation at break in a range of any of the minimums and maximums provided above, such as in a range of from about 250% to about 1200%, from about 400% to about 1200%, or even from about 400% to about 850%.

Furthermore, the film can have a desirable tensile strength. For example, in particular embodiments, the film can have a tensile strength of at least about 10 MPa, at least about 20 MPa, at least about 30 MPa, at least about 40 MPa, at least about 50 MPa, at least about 55 MPa, at least about 60 MPa, at least about 65 MPa, or even at least about 70 MPa. In further embodiments, the film can have a tensile strength of no greater than about 200 MPa, no greater than about 150 MPa, no greater than about 100 MP, or even no greater than about 80 MPa. Moreover, the film can have a tensile strength in a range of any of the minimums and maximums provided above, such as in a range of from about 50 MPa to about 200 MPa, from about 60 MPa to about 150 MPa, from about 10 MPa to about 100 MPa, or even from about 30 MPa to about 80 MPa.

In certain embodiments, the film can have a desirable recovery. Recovery is the ability of a substrate to return to the original dimensions after stretching. In particular embodiments, the film can have a recovery of at least about 30%, at least about 40%, at least about 50%, at least about 60%, at least about 70%, at least about 80%, at least about 85%, or even at least about 90%. In very particular embodiments, the film can have a recovery such that the tape returns to substantially the same size after being stretched. As used herein, recovery is measured by preparing a sample and test set-up as described above, and calculating the recovery according to the following equation III:

$$R = \frac{L - L_r}{L - L_0} * 100\%.$$ Equation III where R refers to Recovery,
L refers to the distance between the benchmarks at the time of rupture,
$L_r$ is the distance between the benchmarks of the ruptured specimen after a 10 min retraction period,
$L_0$ is the initial distance between the bench marks.

In certain embodiments, the film can have a desirable content of pin-hole defects. Pin-hole defects are tiny hole or impurities on the film that can cause un-smoothness and can lead to a decreased film strength. Presence of pin-hole defects can be determined by microscopic inspection. Typically, films which have been cast or skived contain an unacceptable level of pin-hole defects that can result in breakage of the tape when stretched before removed.

Accordingly, in particular embodiments, the film can have a low content of pin-hole defects. For example, in very particular embodiments, the film can be essentially free of pin-hole defects.

As will be discussed in more detail below, particular embodiments of the present disclosure can include a core which is not formed by casting or skiving, but is instead formed by an extrusion method, such as blow-molding followed by calendaring. Accordingly, the film can be an extendable film, for example, an extruded film, such as a blow-molded film, which has been calendared. Without wishing to be bound by theory, it has been surprisingly and unexpectedly found that such extruded films have a significantly lower content or density of pin-hole defects and can be sufficiently stretched to debond the tape without breaking. Referring now to the tape as a whole, in particular embodiments, the tape can have a thickness of at least about 0.01 mm, at least about 0.02 mm, at least about 0.03 mm, at least about 0.035, or even at least about 0.05 mm. In further embodiments, the tape can have a thickness of no greater than about 0.5 mm, no greater than about 0.4 mm, no greater than about 0.3 mm, no greater than about 0.2 mm, or even no greater than about 0.15 mm. Moreover, the tape can have a thickness in a range of any of the minimums and maximums provided above, such as a thickness in a range of from about 0.01 mm to about 0.5 mm, from about 0.02 mm to about 0.4 mm, or even 0.035 mm to about 0.2 mm. It is to be understood that the thickness of the tape is measured and determined from the outer edge of the first adhesive layer to the outer edge of the second adhesive layer, and does not include the thickness of any release liner, if present.

In particular embodiments, the tape can have a desirable overall elongation at break. For example, in particular embodiments, the tape can have an elongation at break of at least about 250%, at least about 300%, at least about 350%, or even at least about 400%. In further embodiments, the tape can have an elongation at break of no greater than about 1200%, no greater than about 1100%, no greater than about 1000%, or even no greater than about 850%. Moreover, the tape can have an elongation at break in a range of any of the minimums and maximums provided above, such as in a range of from about 250% to about 1200%, from about 400% to about 1200%, or even from about 400% to about 850%. Elongation at break is measured according to ASTM D412 as described above.

The tape can have a desirable tensile strength. For example, in particular embodiments, the tape can have a tensile strength of at least about 10 MPa, at least about 20 MPa, at least about 30 MPa, at least about 40 MPa, at least about 50 MPa, at least about 55 MPa, at least about 60 MPa, at least about 65 MPa, or even at least about 70 MPa. In further embodiments, the tape can have a tensile strength of no greater than about 200 MPa, no greater than about 150 MPa, no greater than about 100 MP, or even no greater than about 80 MPa. Moreover, the tape can have a tensile strength in a range of any of the minimums and maximums provided above, such as in a range of from about 50 MPa to about 200 MPa, from about 60 MPa to about 150 MPa, from about 10 MPa to about 100 MPa, or even from about 30 MPa to about 80 MPa. As mentioned above, tensile strength is measured according to ASTM D412 as described above.

In certain embodiments, the tape can have a desirable recovery. Recovery is the ability of a substrate to return to the original dimensions after stretching. In particular embodiments, the tape can have a recovery of at least about 30%, at least about 40%, at least about 50%, at least about 60%, at least about 70%, at least about 80%, at least about 85%, or even at least about 90%. In very particular embodiments, the tape can have a recovery such that the tape returns to substantially the same size after being stretched. Recovery of the tape is measured the same as described above in relation to the film.

To quantify and compare the adhesive strength of tapes, the 180 degree peel adhesion can be measured. As disclosed herein, the 180 degree peel adhesion is measured according to The NTP 9 Test (also referred to as NTP 9). To perform NTP 9, a tape sample having a width of about 1 inch and length of at least about 10 cm is prepared. A backing is attached to a side of the tape sample, and the other side of the tape sample is attached to a substrate. Then, the mounted sample is placed on Mechanical Roll Down Machine and rolled over twice at a speed of 12 inches/min. After a dwell time of 1 hour or 24 hours, the 180 degree peel strength of the tape sample is measured on ChemInstruments AR-1000. Further, the 180 degree peel adhesion test is performed with a dwell time of either 20 minutes or 72 hours. The substrates used in the 180 degree peel testing are an Mg—Al alloy (AZ91D), a stainless steel (SUS 304), and a PC board.

Accordingly, in certain embodiments, the tape can have a 180 degree peel adhesion of at least about 1 N/cm, at least about 1.5 N/cm, at least about 2 N/cm, at least about 2.5 N/cm, or even at least about 3 N/cm as measured according to NTP 9 with a dwell time of 20 minutes and a test substrate of an Mg—Al alloy (AZ91D). In further embodiments, the tape can have a 180 degree peel adhesion of no greater than about 60 N/cm, no greater than about 55 N/cm, no greater than about 50 N/cm, no greater than about 20 N/cm, no greater than about 15 N/cm, no greater than about 10 N/cm, no greater than about 8 N/cm, or even no greater than about 5 N/cm as measured according to NTP 9 with a dwell time of 20 minutes and a test substrate of an Mg—Al alloy (AZ91D). Moreover, the tape can have a 180 degree peel adhesion in a range of any of the minimums and maximums provided above, such as in a range of from about 1 N/cm to about 60 N/cm, or even from about 2 N/cm to about 50 N/cm as measured according to NTP 9 with a dwell time of 20 minutes and a test substrate of an Mg—Al alloy (AZ91D).

Further, in certain embodiments, the tape can have a 180 degree peel adhesion of at least about 1 N/cm, at least about 1.5 N/cm, at least about 2 N/cm, at least about 2.5 N/cm, or even at least about 3 N/cm as measured according to NTP 9 with a dwell time of 72 hours and a test substrate of an Mg—Al alloy (AZ91D). In further embodiments, the tape can have a 180 degree peel adhesion of no greater than about 60 N/cm, no greater than about 55 N/cm, no greater than about 50 N/cm, no greater than about 20 N/cm, no greater than about 15 N/cm, no greater than about 10 N/cm, no greater than about 8 N/cm, or even no greater than about 5 N/cm as measured according to NTP 9 with a dwell time of 72 hours and a test substrate of an Mg—Al alloy (AZ91D). Moreover, the tape can have a 180 degree peel adhesion in a range of any of the minimums and maximums provided above, such as in a range of from about 1 N/cm to about 60 N/cm, or even from about 2 N/cm to about 50 N/cm as measured according to NTP 9 with a dwell time of 72 hours and a test substrate of an Mg—Al alloy (AZ91D).

Accordingly, in certain embodiments, the tape can have a 180 degree peel adhesion of at least about 1 N/cm, at least about 1.5 N/cm, at least about 2 N/cm, at least about 2.5 N/cm, or even at least about 3 N/cm as measured according to NTP 9 with a dwell time of 20 minutes and a test substrate of SUS 304. In further embodiments, the tape can have a 180 degree peel adhesion of no greater than about 60 N/cm, no greater than about 55 N/cm, no greater than about 50 N/cm, no greater than about 20 N/cm, no greater than about 15 N/cm, no greater than about 10 N/cm, no greater than about 8 N/cm, or even no greater than about 5 N/cm as measured according to NTP 9 with a dwell time of 20 minutes and a test substrate of SUS 304. Moreover, the tape can have a 180 degree peel adhesion in a range of any of the minimums and maximums provided above, such as in a range of from about 1 N/cm to about 60 N/cm, or even from about 2 N/cm to about 50 N/cm as measured according to NTP 9 with a dwell time of 20 minutes and a test substrate of SUS 304.

Further, in certain embodiments, the tape can have a 180 degree peel adhesion of at least about 1 N/cm, at least about 1.5 N/cm, at least about 2 N/cm, at least about 2.5 N/cm, or even at least about 3 N/cm as measured according to NTP 9 with a dwell time of 72 hours and a test substrate of SUS 304. In further embodiments, the tape can have a 180 degree peel adhesion of no greater than about 60 N/cm, no greater than about 55 N/cm, no greater than about 50 N/cm, no greater than about 20 N/cm, no greater than about 15 N/cm, no greater than about 10 N/cm, no greater than about 8 N/cm, or even no greater than about 5 N/cm as measured according to NTP 9 with a dwell time of 72 hours and a test substrate of SUS 304. Moreover, the tape can have a 180 degree peel adhesion in a range of any of the minimums and maximums provided above, such as in a range of from about 1 N/cm to about 60 N/cm, or even from about 2 N/cm to about 50 N/cm as measured according to NTP 9 with a dwell time of 72 hours and a test substrate of SUS 304.

Accordingly, in certain embodiments, the tape can have a 180 degree peel adhesion of at least about 1 N/cm, at least about 1.5 N/cm, at least about 2 N/cm, at least about 2.5 N/cm, or even at least about 3 N/cm as measured according to NTP 9 with a dwell time of 20 minutes and a test substrate of a PC board. In further embodiments, the tape can have a 180 degree peel adhesion of no greater than about 60 N/cm, no greater than about 55 N/cm, no greater than about 50 N/cm, no greater than about 20 N/cm, no greater than about 15 N/cm, no greater than about 10 N/cm, no greater than about 8 N/cm, or even no greater than about 5 N/cm as measured according to NTP 9 with a dwell time of 20 minutes and a test substrate of a PC board. Moreover, the tape can have a 180 degree peel adhesion in a range of any of the minimums and maximums provided above, such as in a range of from about 1 N/cm to about 60 N/cm, or even from about 2 N/cm to about 50 N/cm as measured according to NTP 9 with a dwell time of 20 minutes and a test substrate of a PC board.

Further, in certain embodiments, the tape can have a 180 degree peel adhesion of at least about 1 N/cm, at least about 1.5 N/cm, at least about 2 N/cm, at least about 2.5 N/cm, or even at least about 3 N/cm as measured according to NTP 9 with a dwell time of 72 hours and a test substrate of a PC board. In further embodiments, the tape can have a 180 degree peel adhesion of no greater than about 60 N/cm, no greater than about 55 N/cm, no greater than about 50 N/cm, no greater than about 20 N/cm, no greater than about 15 N/cm, no greater than about 10 N/cm, no greater than about 8 N/cm, or even no greater than about 5 N/cm as measured according to NTP 9 with a dwell time of 72 hours and a test substrate of a PC board. Moreover, the tape can have a 180 degree peel adhesion in a range of any of the minimums and maximums provided above, such as in a range of from about 1 N/cm to about 60 N/cm, or even from about 2 N/cm to about 50 N/cm as measured according to NTP 9 with a dwell time of 72 hours and a test substrate of a PC board.

In certain embodiments, the tape can have a desirable tensile adhesion. As used herein, tensile adhesion is measured according to The NTP 11 Test (also referred to as NTP 11 as is described in detail herein. A tape sample having a size of 1 inch by 1 is prepared for performing NTP 11. The tape sample is placed at the bottom of a T-block. After removing the liner of the tape (if applicable), the T-block is taped to a stainless steel substrate, and the mounted sample is then allowed to bond for 15 seconds under a pressure of 25 psi. After a dwell time of 20 min at room temperature (20° C. to 25° C.), the sample assembly is placed on an instrument of Instron-3365 to perform tensile strength test at a separation rate of 30 cm/min.

In particular embodiments, the tape can have a tensile adhesion of at least about 10 N/inch$^2$, at least about 15 N/inch$^2$, at least about 20 N/inch$^2$, at least about 25 N/inch$^2$, at least about 30 N/inch$^2$, at least about 35 N/inch$^2$, or even at least about 40 N/inch$^2$.

In certain embodiments, the tape can have a desirable performance in stretch-out testing. Stretch-out testing is a quantifiable simulation of using the tape. As used herein, stretch-out testing is performed according to THE STRETCH-OUT TEST, which is described in detail below.

Figure 3:
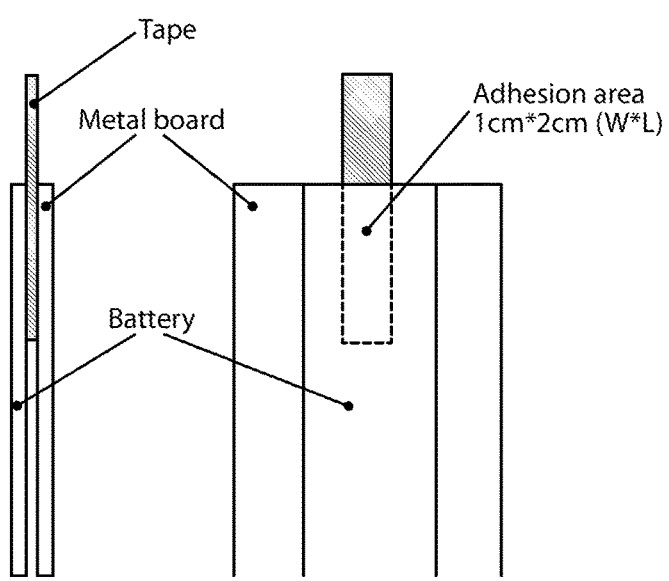
FIG. 3 includes an illustration of a test setup for testing under the Stretch-Out Test and Drop Test.

The Stretch Out Test is performed by placing a double coated tape sample having the dimensions of 1 cm by 4 cm between a metal board (Mg—Al alloy (AZ91D) and a battery with an adhesion area of 1 cm by 2 cm. The mounted sampled is then placed between two jaws of a Texture Analyzer (TA-XT Plus) with a load cell of 500 N. The jaws are separated at a speed of 50 mm/min while recording the force and distance by stretching. A representation of the test sample is illustrated in FIG. 3.

The results of a stretch out test can be reported as a particular stretch-out distance over an incrementally increasing stretch-out force, otherwise referred to as a stretch-out profile. Typically, results can be illustrated graphically over the range of stretch-out forcing used in the test.

A particular advantage of certain embodiments of the present disclosure is the surprising discovery of a tape having a unique stretch-out profile. For example, it has been discovered that tapes according to certain embodiments of the present disclosure can have a particularly short stretch-out distance with acceptable stretch force.

Accordingly, in particular embodiments, the tape can have a stretch out profile in which the average force is required to stretch the tape the first 20 mm, the first 30 mm, the first 40 mm, the first 50 mm, the first 60 mm, the first 70 mm, the first 80 mm, the first 90 mm, the first 100 mm, or even the first 120 mm is greater than 2N.

In further embodiments, the tape can have a stretch out profile in which the average force is required to stretch the tape the first 20 mm, the first 30 mm, the first 40 mm, the first 50 mm, the first 60 mm, the first 70 mm, the first 80 mm, the first 90 mm, the first 100 mm, or even the first 120 mm is greater than 3N.

In still further embodiments, the tape can have a stretch out profile in which the average force is required to stretch the tape the first 20 mm, 30 mm, 40 mm, 50 mm, 60 mm, 70 mm, 80 mm, 90 mm, 100 mm, or even the first 120 mm is greater than 4N.

In yet other particular embodiments, the tape can have a stretch out profile in which the average force is required to stretch the tape the first 20 mm, 30 mm, 40 mm, 50 mm, 60 mm, 70 mm, 80 mm, 90 mm, 100 mm, or even the first 120 mm is greater than 5N.

Moreover, in particular embodiments, the tape can have a stretch out profile in which the average force is required to stretch the tape the first 20 mm, the first 30 mm, the first 40 mm, the first 50 mm, the first 60 mm, the first 70 mm, the first 80 mm, the first 90 mm, or even the first 100 mm is greater than 6N.

In further embodiments, the tape can have a stretch out profile in which the force required to stretch the tape increases at an average rate of greater than 1N per 10 mm over the first 10 mm, the first 20 mm, or even the first 30 mm of stretch distance.

In further embodiments, the tape can have a stretch out profile in which the force required to stretch the tape increases at an average rate of greater than 1.5N per 10 mm over the first 10 mm, the first 20 mm, or even the first 30 mm of stretch distance.

In further embodiments, the tape can have a stretch out profile in which the force required to stretch the tape increases at an average rate of greater than 2N per 10 mm over the first 10 mm, the first 20 mm, or even the first 25 mm of stretch distance.

In further embodiments, the tape can have a desirable aged stretch-out performance. For example, the tape can have the stretch-out characteristics recited above after aging for about 2 hours at ambient conditions. In further embodiments, the tape can have the stretch-out characteristics recited above after aging at ambient conditions for about 48 hours. In further embodiments, the tape can have the stretch-out characteristics recited above after aging at 50 degrees Celsius for about 40 hours.

In certain embodiments, the tape can have a desirable performance in the drop test. The drop test is a measure of the ability of the tape to maintain adhesion after being dropped. The drop test is performed according to the test method outlined below.

To perform the drop test, a tape sample having the dimension 1 cm by 9 cm is placed between metal board (Mg—Al alloy AZ91D) and a battery with an adhesion area of 1 cm by 8 cm. The mounted sample is then dropped 6 times, each time on a different side from 1 m high to the ground. If separation occurs on any of the 6 drops, the mounted sample fails the drop test. If no separation occurs after all 6 drops, the mounted sample passes the drop test.

Accordingly, in certain embodiments, the tape can pass the drop test.

In very advantageous embodiments, the tape can contain any combination of the properties or characteristics described above. For example, a particular advantage of certain embodiments of the present disclosure is the ability to obtain the performances such stretch out performance, tensile strength, and drop test at very low thicknesses.

Another aspect of the present disclosure is directed to a method of forming an adhesive tape, in particular an adhesive tape according to any one of the embodiments described above.

In general, the method of forming an adhesive tape can include: providing a core having a first outer major surface and a second outer major surface; forming a first adhesive layer on the first outer major surface of the extruded thermoplastic polyurethane film; and forming a second adhesive layer on the second outer major surface of the extruded thermoplastic polyurethane film.

The core, first adhesive layer, and the second adhesive layer can include any of the options or characteristics described above.

In particular embodiments, the method can include extruding the thermoplastic polyurethane film. For example, in very particular embodiments extruding the thermoplastic polyurethane film can include blow molding the polyurethane film. In further embodiments, the method can include calendering the thermoplastic polyurethane film.

The method can include coating the first adhesive layer onto a release liner or carrier; contacting the formed first adhesive layer with the thermoplastic polyurethane film; and forming the second adhesive layer on the thermoplastic polyurethane film.

Another aspect of the present disclosure is directed to an assembly comprising the adhesive tape of any of the embodiments described above. In particular embodiments, the assembly can include a mobile phone. Accordingly, in certain embodiments, the first component, the second component, and the adhesive tape can be a mobile phone subcomponent.

In certain embodiments, the assembly can include a first component adhered to a second component via the adhesive tape.

In very particular embodiments, the first component can be a battery, a PBC board, a lens, a LCD screen, or a combination thereof and the second component can include a housing. In particular embodiments, the first component can include a battery.

EXAMPLES

Samples were prepared and tested for their effectiveness. Each sample contained a core and two adhesive layers forming outer surfaces of the tape.

Sample 1 contains a thermoplastic polyurethane film core having a thickness of 0.05 mm. The thermoplastic polyurethane film was formed from blow-molding and calendaring. The polyurethane film had a tensile strength of 78 MPa and an elongation at break of 640% as measured according to ASTM D412. The adhesive used to form the two adhesive layers was a pressure sensitive adhesive. Each adhesive layers had a thickness of 0.025 mm. The tape's overall thickness was 0.10 mm.

Sample 2 was identical to sample 1, except sample 2 contained a thermoplastic polyurethane film core having a thickness of 0.1 mm. Again, the thermoplastic polyurethane film was formed from blow-molding and calendaring. The polyurethane film had a tensile strength of 71 MPa and an elongation at break of 720%.

Example 1—180 Degree Peel Testing and Tensile Adhesion Testing

Samples 1 and 2 were then tested for 180 degree peel testing and tensile adhesion testing according to the methods outlined in detail above. The following results were obtained:

TABLE 1

Results of 180 degree Peel Testing and Tensile Adhesion

| Parameter | Sample 1 | Sample 2 |
|---|---|---|
| 180 degree Peel Test with a 20 minute dwell time (N/cm) | | |
| Mg—Al alloy (AZ91D) | 3.04 | 2.57 |
| SUS 304 | 1.66 | 1.37 |
| PC board | 3.31 | 2.60 |
| 180 degree Peel Test with a 72 hour dwell time (N/cm) | | |
| Mg—Al alloy (AZ91D) | 3.16 | 2.62 |
| SUS 304 | 2.03 | 1.65 |
| PC board | 3.45 | 2.60 |
| Tensile Adhesion (N/inch$^2$) | 40.0 | 47.5 |

Example 2—Stretch-Out Testing

Sample 1 and a comparative example were also tested for stretch-out performance according to the method described in detail above and the illustration of the test set-up in FIG. 3.

In particular, the tape sample having dimensions of 1 cm by 4 cm is placed between a metal board (Mg—Al alloy AZ91D) and a battery with an adhesion area of 1 cm by 2 cm. The mounted sample is then placed between two jaws of a Texture Analyzer, and the jaws are separated at speed of 50 mm/min. The force and distance by stretching is recorded.

The comparative sample tested was TESA™ 70415, which was obtained from Tesa SE. This tape is a double sided bonding tape having a thickness of 0.15 mm. It is composed of a single layer rubber-like based copolymer of styrene and butadiene. It has a tensile strength of less than 10 MPa and an elongation at break greater than 800%.

Figure 4:
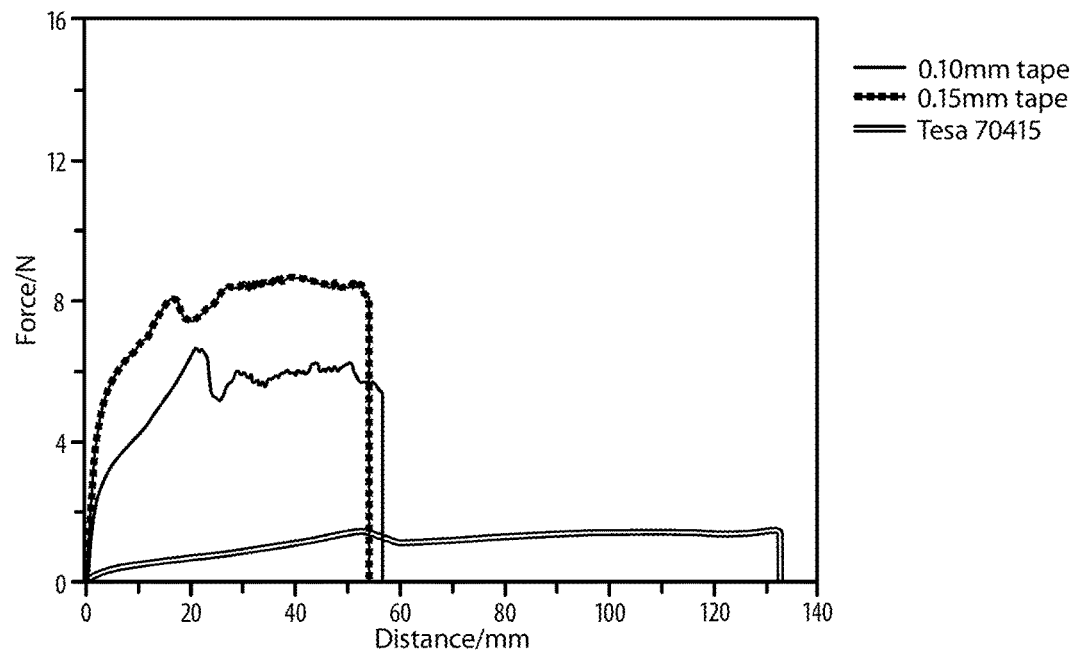
FIG. 4 includes a graph of results of a stretch out test according to one embodiment.

The results are reported in FIG. 4. As illustrated, the comparative sample shows a very tiny stretching-out force and very long distance (about 5 times of adhesion length) needed to be stretched out. In contrast, sample 1 shows a short stretching-out distance (less than 2.5 times of adhesion length) and with an acceptable stretch force.

Example 3—Aged Stretch Out

Figure 5:
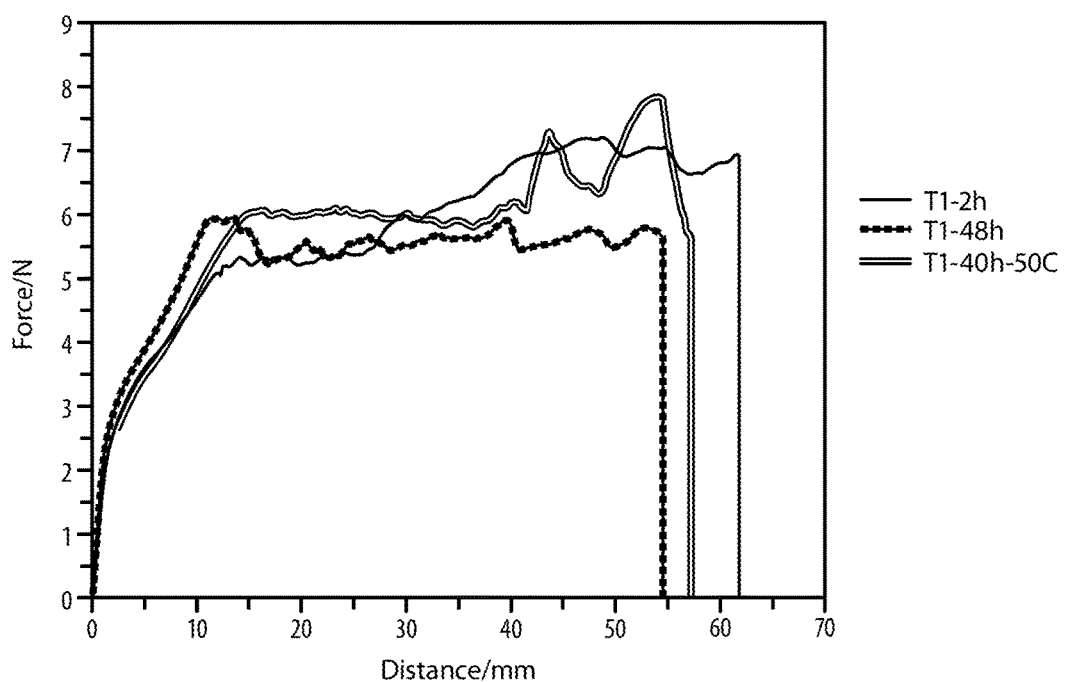
FIG. 5 includes a graph of results of an aged stretch out test according to one embodiment.
Figure 6:
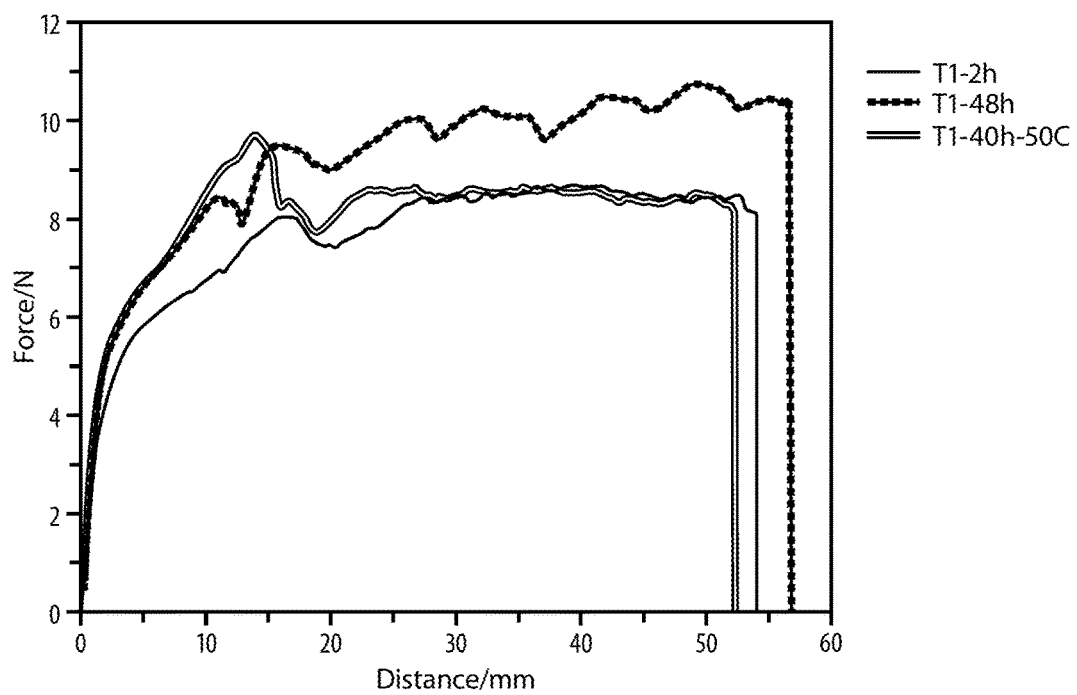
FIG. 6 includes a graph of results of an aged stretch out test according to one embodiment.

Samples 1 and 2 were also tested for their aged stretch-out performance after ageing at 2 hours at ambient conditions, 48 hours at ambient conditions, and at 40 hours at 50 degrees Celsius. The results for Sample 1 are reported in FIG. 5, and the results for Sample 2 are reported in FIG. 6. As can be seen the aged stretch-out performance closely matches the stretch-out performance of the unaged sample indicating that the tape is stable.

Example 4—Drop Testing

Samples 1 and 2 were also tested for the performance in the drop test. The drop test was performed as described in detail above and as illustrated in FIG. 3.

In particular, the tape sample having a dimension of 1 cm by 9 cm is placed between a metal board (Mg—Al alloy AZ91D) and a battery with an adhesion area of 1 cm by 8 cm. The mounted sample was then dropped 6 times on all six different sides from 1 m high to the ground. If separation occurs in any of the 6 drops, the sample fails the test. Likewise, if no separation occurs after the 6 drops, the sample passes the test.

Both mounted samples passed the drop test as no separation between the mounted components was observed.

Example 5—Adhesion Build Up

The adhesive used in Samples 1 and 2 was also tested for its adhesion build up. In particular, the adhesive composition was coated onto a PET film and dried. The sample is then tested for 180 degree peel adhesion as described above, by attaching the sample to a stainless steel substrate (SUS 304) and allowing a dwell time of 20 minutes, 1 hour, 4 hours, 24 hours, and 72 hours. The following results were obtained:

TABLE 2

| Adhesion Build Up | | | | | |
|---|---|---|---|---|---|
| | 20 min | 1 h | 4 h | 24 h | 72 h |
| 180° peel (N/inch) | 4.14 | 5.57 | 5.64 | 8.91 | 9.09 |

The ratio of the 180 degree peel test at 20 minutes and 72 hours was calculated and multiplied by 100% to arrive at about 45%, the adhesion build up of the adhesive composition.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A tape comprising:
a. a first adhesive layer forming a first outer major surface of the tape;
b. a second adhesive layer forming a second outer major surface of the tape;
c. a core disposed between the first adhesive layer and the second adhesive layer, wherein the core comprises a thermoplastic polyurethane film having at least two of the following properties:
  i. an elongation at break of at least about 400%;
  ii. a tensile strength of at least about 50 MPa;
  iii. a recovery of at least about 30%; and
  iv. a thickness of no greater than about 0.3 mm.
d. wherein the adhesive tape is stretch releasable without breaking.

Embodiment 2

A tape comprising:
a. a first adhesive layer forming a first outer major surface of the tape;
b. a second adhesive layer forming a second outer major surface of the tape;
c. a core disposed between the first adhesive layer and the second adhesive layer, wherein the core comprises a thermoplastic film having a recovery of at least about 30% and at least one of the following properties:
  i. an elongation at break of at least about 400%;
  ii. a tensile strength of at least about 50 MPa;
  iii. a thickness of no greater than about 0.3 mm; or
  iv. combinations thereof.
d. wherein the adhesive tape is stretch releasable without breaking.

Embodiment 3

A tape comprising:
a. a first adhesive layer forming a first outer major surface of the tape, wherein the first adhesive layer comprises an acrylic adhesive;
b. a second adhesive layer forming a second outer major surface of the tape, wherein the second adhesive layer comprises an acrylic adhesive;
c. a core disposed between the first adhesive layer and the second adhesive layer, wherein the core comprises a thermoplastic polyurethane film.

Embodiment 4

A method of forming a tape, the method comprising:
a. providing an extendable thermoplastic polyurethane film having a first outer major surface and a second outer major surface;
b. forming a first adhesive layer on the first outer major surface of the extendable thermoplastic polyurethane film; and
c. forming a second adhesive layer on the second outer major surface of the extendable thermoplastic polyurethane film.

Embodiment 5

The tape or method of any one of the preceding embodiments, wherein the first adhesive layer and/or the second adhesive layer comprises an acrylic adhesive.

Embodiment 6

The tape or method of any one of the preceding embodiments, wherein the first adhesive layer and/or the second adhesive layer has a thickness in a range of from about 0.005 mm to about 0.050 mm, or even from about 0.01 mm to about 0.04 mm.

Embodiment 7

The tape or method of any one of the preceding embodiments, wherein the first adhesive layer and/or the second adhesive layer has an adhesion build up of at least about 10% as measured as a ratio of 180 degree peel adhesion on a stainless steel substrate after a dwell time of 20 minutes and that of 72 hours multiplied by 100%.

Embodiment 8

The tape or method of any one of the preceding embodiments, wherein the first adhesive layer and/or the second adhesive layer has an adhesion build up of no greater than about 70% as measured as the ratio of 180 degree peel adhesion on a stainless steel substrate after a dwell time of 20 minutes and that of 72 hours multiplied by 100%.

Embodiment 9

The tape or method of any one of the preceding embodiments, wherein the first adhesive layer and/or the second adhesive layer has an adhesion build up in a range of from about 10% to about 70% as measured as the ratio of 180 degree peel adhesion on a stainless steel substrate after a dwell time of 20 minutes and that of 72 hours multiplied by 100%

Embodiment 10

The tape or method of any one of the preceding embodiments, wherein the film comprises a thermoplastic polyurethane.

Embodiment 11

The tape or method of any one of the preceding embodiments, wherein the film has a thickness of at least about 0.005 mm, at least about 0.008 mm, or even at least about 0.01 mm.

Embodiment 12

The tape or method of any one of the preceding embodiments, wherein the film has a thickness of no greater than about 0.45 mm, no greater than about 0.3 mm, no greater than about 0.2 mm, no greater than about 0.1 mm, no greater than about 0.05 mm, no greater than about 0.045 mm, no greater than about 0.04 mm, no greater than about 0.035 mm, no greater than about 0.03 mm, no greater than about 0.025 mm, or even no greater than about 0.02 mm.

Embodiment 13

The tape or method of any one of the preceding embodiments, wherein the film has an elongation at break of at least about 250%, at least about 300%, at least about 350%, or even at least about 400%.

Embodiment 14

The tape or method of any one of the preceding embodiments, wherein the film has an elongation at break of no greater than about 1200%, no greater than about 1100%, no greater than about 1000%, or even no greater than about 850%.

Embodiment 15

The tape or method of any one of the preceding embodiments, wherein the film has an elongation at break in a range of from about 250% to about 1200%, from about 400% to about 1200%, or even from about 400% to about 850%.

Embodiment 16

The tape or method of any one of the preceding embodiments, wherein the film has a tensile strength of at least about 10 MPa, at least about 20 MPa, at least about 30 MPa, at least about 40 MPa, at least about 50 MPa, at least about 55 MPa, at least about 60 MPa, at least about 65 MPa, or even at least about 70 MPa.

Embodiment 17

The tape or method of any one of the preceding embodiments, wherein the film has a tensile strength of no greater than about 200 MPa, no greater than about 150 MPa, no greater than about 100 MP, or even no greater than about 80 MPa.

Embodiment 18

The tape or method of any one of the preceding embodiments, wherein the film has a tensile strength in a range of from about 10 MPa to about 100 MPa, or even from about 30 MPa to about 80 MPa.

Embodiment 19

The tape or method of any one of the preceding embodiments, wherein the tape has a tensile adhesion of at least about 10 N/inch$^2$, at least about 15 N/inch$^2$, at least about 20 N/inch$^2$, at least about 25 N/inch$^2$, at least about 30 N/inch$^2$, at least about 35 N/inch$^2$, or even at least about 40 N/inch$^2$.

Embodiment 20

The tape or method of any one of the preceding embodiments, wherein the film has a recovery of at least about 30%, at least about 40%, at least about 50%, at least about 60%, at least about 70%, at least about 80%, at least about 85%, or even at least about 90%.

Embodiment 21

The tape or method of any one of the preceding embodiments, wherein the tape returns to substantially the same size after recovery from being stretched and debonded from adhered components.

Embodiment 22

The tape or method of any one of the preceding embodiments, wherein the film is essentially free of pin hole defects.

Embodiment 23

The tape or method of any one of the preceding embodiments, wherein the tape has a thickness of no greater than about 0.5 mm, no greater than about 0.4 mm, no greater than about 0.3 mm, no greater than about 0.2 mm, or even no greater than about 0.15 mm.

Embodiment 24

The tape or method of any one of the preceding embodiments, wherein the tape has a thickness of at least about 0.01 mm, at least about 0.03 mm, or even at least about 0.05 mm.

Embodiment 25

The tape or method of any one of the preceding embodiments, wherein the tape has a thickness in a range of from about 0.02 mm to about 0.4 mm, or even from about 0.035 mm to about 0.2 mm.

Embodiment 26

The tape or method of any one of the preceding embodiments, wherein the tape has an elongation at break of 250%, at least about 300%, at least about 350%, or even at least about 400%.

Embodiment 27

The tape or method of any one of the preceding embodiments, wherein the tape has an elongation at break of no greater than about 1200%, no greater than about 1100%, no greater than about 1000%, or even no greater than about 850%.

Embodiment 28

The tape or method of any one of the preceding embodiments, wherein the tape has an elongation at break in a range of from about 250% to about 1200%, from about 400% to about 1200%, or even from about 400% to about 850%.

Embodiment 29

The tape of any one of the preceding embodiments, wherein the tape has a tensile strength of at least about 10 MPa, at least about 20 MPa, at least about 30 MPa, at least about 40 MPa, at least about 50 MPa, at least about 55 MPa, at least about 60 MPa, at least about 65 MPa, or even at least about 70 MPa.

Embodiment 30

The tape of any one of the preceding embodiments, wherein the tape has a tensile strength of no greater than about 200 MPa, no greater than about 150 MPa, no greater than about 100 MP, or even no greater than about 80 MPa.

Embodiment 31

The tape of any one of the preceding embodiments, wherein the tape has a tensile strength in a range of from about 10 MPa to about 100 MPa, or even from about 30 MPa to about 80 MPa.

Embodiment 32

The tape or method of any one of the preceding embodiments, wherein the tape is adapted to lose adhesive strength when stretched.

Embodiment 33

The tape or method of any one of the preceding embodiments, wherein the tape is stretch removable without breaking.

Embodiment 34

The tape or method of any one of the preceding embodiments, wherein the tape has a recovery of at least about 30%, at least about 40%, at least about 50%, at least about 60%, at least about 70%, at least about 80%, at least about 85%, or even at least about 90%.

Embodiment 35

The tape or method of any one of the preceding embodiments, wherein the tape returns to substantially the same size after recovery from being stretched and debonded from adhered components.

Embodiment 36

The tape or method of any one of the preceding embodiments, wherein the tape has a 180° peel force in a range of from about 1 N/cm to about 60 N/cm, or even from about 2 N/cm to about 50 N/cm as measured according to NTP 9 with a dwell time of 20 minutes and a test substrate of an Mg—Al alloy (AZ91D), a SUS 304, and/or a PC board.

Embodiment 37

The tape or method of any one of the preceding embodiments, wherein the tape has a 180° peel force in a range of from about 1 N/cm to about 60 N/cm, or even from about 2 N/cm to about 50 N/cm as measured according to NTP 9 with a dwell time of 72 hours and a test substrate of an Mg—Al alloy (AZ91D), a SUS 304, and/or a PC board.

Embodiment 38

The tape or method of any one of the preceding embodiments, wherein the tape has a tensile adhesion of at least about 10 N/inch$^2$, at least about 15 N/inch$^2$, at least about 20 N/inch$^2$, at least about 25 N/inch$^2$, at least about 30 N/inch$^2$, at least about 35 N/inch$^2$, or even at least about 40 N/inch$^2$.

Embodiment 39

The tape or method of any one of the preceding embodiments, wherein the tape has a stretch out profile in which the average force is required to stretch the tape the first 20 mm, the first 30 mm, the first 40 mm, the first 50 mm, the first 60 mm, the first 70 mm, the first 80 mm, the first 90 mm, the first 100 mm, or even the first 120 mm is greater than 2N as measured according to the stretch-out test.

Embodiment 40

The tape or method of any one of the preceding embodiments, wherein the tape has a stretch out profile in which the average force is required to stretch the tape the first 20 mm, the first 30 mm, the first 40 mm, the first 50 mm, the first 60 mm, the first 70 mm, the first 80 mm, the first 90 mm, the first 100 mm, or even the first 120 mm is greater than 3N as measured according to the stretch-out test.

Embodiment 41

The tape or method of any one of the preceding embodiments, wherein the tape has a stretch out profile in which the average force is required to stretch the tape the first 20 mm, 30 mm, 40 mm, 50 mm, 60 mm, 70 mm, 80 mm, 90 mm, 100 mm, or even the first 120 mm is greater than 4N as measured according to the stretch-out test.

Embodiment 42

The tape or method of any one of the preceding embodiments, wherein the tape has a stretch out profile in which the average force is required to stretch the tape the first 20 mm, 30 mm, 40 mm, 50 mm, 60 mm, 70 mm, 80 mm, 90 mm, 100 mm, or even the first 120 mm is greater than 5N.

Embodiment 43

The tape or method of any one of the preceding embodiments, wherein the tape has a stretch out profile in which the average force is required to stretch the tape the first 20 mm, the first 30 mm, the first 40 mm, the first 50 mm, the first 60 mm, the first 70 mm, the first 80 mm, the first 90 mm, or even the first 100 mm is greater than 6N.

Embodiment 44

The tape or method of any one of the preceding embodiments, wherein the tape has a stretch out profile in which the force required to stretch the tape increases at an average rate of greater than 1N per 10 mm over the first 10 mm, the first 20 mm, or even the first 30 mm of stretch distance as measured according to the stretch-out test.

Embodiment 45

The tape or method of any one of the preceding embodiments, wherein the tape has a stretch out profile in which the force required to stretch the tape increases at an average rate of greater than 1.5N per 10 mm over the first 10 mm, the first 20 mm, or even the first 30 mm of stretch distance as measured according to the stretch-out test.

Embodiment 46

The tape or method of any one of the preceding embodiments, wherein the tape has a stretch out profile in which the force required to stretch the tape increases at an average rate of greater than 2N per 10 mm over the first 10 mm, the first 20 mm, or even the first 25 mm of stretch distance as measured according to the stretch-out test.

Embodiment 47

The tape or method of any one of the preceding embodiments, wherein the tape has an aged stretch out profile in which the average force is required to stretch the tape the first 20 mm, the first 30 mm, the first 40 mm, the first 50 mm, the first 60 mm, the first 70 mm, the first 80 mm, the first 90 mm, the first 100 mm, or even the first 120 mm is greater than 2N, 3N, 4N, 5N, or even 6N as measured according to the stretch-out test after aging of 2 hours at ambient conditions, after aging of 48 hours at ambient condition, and/or after aging of 40 hours at 50 degrees Celsius.

Embodiment 48

The tape or method of any one of the preceding embodiments, wherein the tape has a stretch out profile in which the force required to stretch the tape increases at an average rate of greater than 1N, greater than 1.5N, or even greater than 2N per 10 mm over the first 10 mm, the first 20 mm, or even the first 25 mm of stretch distance as measured according to the stretch-out test after aging of 2 hours at ambient conditions, after aging of 48 hours at ambient condition, and/or after aging of 40 hours at 50 degrees Celsius.

Embodiment 49

The tape or method of any one of the preceding embodiments, wherein the tape passes The Drop Test.

Embodiment 50

The tape or method of any one of the preceding embodiments, wherein the tape further includes a first releasable liner disposed adjacent the first adhesive layer.

Embodiment 51

The tape or method of any one of the preceding embodiments, wherein the tape further includes a first releasable liner disposed adjacent the first adhesive layer, and a second releasable liner disposed adjacent the second adhesive layer.

Embodiment 52

The method of any one of the preceding embodiments, wherein the method further comprises extruding the thermoplastic polyurethane film.

Embodiment 53

The method of any one of the preceding embodiments, wherein providing an extendable film comprises providing a blow-molded film.

Embodiment 54

The method of any one of the preceding embodiments, wherein providing an extendable film comprises providing a blow-molded and calendared film.

Embodiment 55

The method of any one of the preceding embodiments, wherein the method further comprises blow-molding the film.

Embodiment 56

The method of any one of the preceding embodiments, wherein the method further includes calendaring the film.

Embodiment 57

The method of any one of the preceding embodiments, wherein the method comprises coating the first adhesive layer onto a release liner or carrier; contacting the formed first adhesive layer with the film; and forming the second adhesive layer on the film.

Embodiment 58

An assembly comprising:
a. a first component;
b. a second component; and
c. the adhesive tape of any one of the preceding items disposed between and adhering the first component to the second component.

Embodiment 59

The assembly of any one of the preceding embodiments, wherein at least one of the first component or second component comprises a battery, PBC board, lens, LCD screen, or a combination thereof.

Embodiment 60

The assembly of any one of the preceding embodiments, wherein the first component comprises a housing.

Embodiment 61

The assembly of any one of the preceding embodiments, wherein the second component comprises a battery.

Embodiment 62

The assembly of any one of the preceding embodiments, wherein the assembly comprises a mobile phone, and wherein the first component and the second component are mobile phone subcomponents.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A tape comprising:
a. a first adhesive layer forming a first outer major surface of the tape;
b. a second adhesive layer forming a second outer major surface of the tape;
c. a core disposed between the first adhesive layer and the second adhesive layer, wherein the core comprises a thermoplastic film having a recovery of at least about 50% and a tensile strength of at least about 50 MPa;
wherein the adhesive tape is stretch releasable without breaking.

2. The tape of claim 1, wherein the first adhesive layer and/or the second adhesive layer comprises an acrylic adhesive.

3. The tape of claim 1, wherein the first adhesive layer and/or the second adhesive layer has a thickness in a range of from about 0.005 mm to about 0.050 mm.

4. The tape of claim 1, wherein the first adhesive layer and/or the second adhesive layer has an adhesion build up in a range of from about 10% to about 70% as measured as a ratio of 180 degree peel adhesion on a stainless steel substrate after a dwell time of 20 minutes and that of 72 hours multiplied by 100%.

5. The tape of claim 1, wherein the film comprises a thermoplastic polyurethane.

6. The tape of claim 1, wherein the tape has a thickness in a range of from about 0.02 mm to about 0.4 mm.

7. The tape of claim 1, wherein the tape has an elongation at break in a range of from about 250% to about 1200%.

8. The tape of claim 1, wherein the tape has a tensile strength of not greater than about 100 MPa.

9. The tape of claim 1, wherein the tape has a 180° peel adhesion in a range of from about 1 N/cm to about 60 N/cm, as measured according to NTP 9 with a dwell time of 20 minutes and a test substrate of an Mg—Al alloy (AZ91D), a SUS 304, and/or a PC board.

10. The tape of claim 1, wherein the tape has a 180° peel force in a range of from about 1 N/cm to about 60 N/cm, as measured according to NTP 9 with a dwell time of 72 hours and a test substrate of an Mg—Al alloy (AZ91D), a SUS 304, and/or a PC board.

11. The tape of claim 1, wherein the tape has a tensile adhesion of at least about 10 N/inch$^2$.

12. The tape of claim 1, wherein the tape has a stretch out profile in which the average force is required to stretch the tape the first 20 mm, is greater than 3N as measured according to the stretch-out test.

13. The tape of claim 1, wherein the tape has a stretch out profile in which the force required to stretch the tape increases at an average rate of greater than 2N per 10 mm over the first 10 mm of stretch distance as measured according to the stretch-out test.

14. The tape of claim 1, wherein the tape has an aged stretch out profile in which the average force is required to stretch the tape the first 20 mm is greater than 2N, as measured according to the stretch-out test after aging of 2 hours at ambient conditions, after aging of 48 hours at ambient condition, and/or after aging of 40 hours at 50 degrees Celsius.

15. The tape of claim 1, wherein the tape passes The Drop Test.

16. An assembly comprising:
a. a housing;
b. a battery; and
c. the adhesive tape of claim 1 disposed between and adhering the housing to the battery.

17. A tape comprising:
a. a first adhesive layer forming a first outer major surface of the tape, wherein the first adhesive layer comprises an acrylic adhesive;
b. a second adhesive layer forming a second outer major surface of the tape, wherein the second adhesive layer comprises an acrylic adhesive; and
c. a core disposed between the first adhesive layer and the second adhesive layer, wherein the core comprises a thermoplastic polyurethane film,
wherein the core has a recovery of at least about 50% and a tensile strength of at least about 50 MPa.

18. A method of forming a tape, the method comprising:
a. providing an extendable thermoplastic polyurethane film having a first outer major surface and a second outer major surface;
b. forming a first adhesive layer on the first outer major surface of the extendable thermoplastic polyurethane film; and
c. forming a second adhesive layer on the second outer major surface of the extendable thermoplastic polyurethane film,
wherein the core has a recovery of at least about 50% and a tensile strength of at least about 50 MPa.

* * * * *